(12) United States Patent
Buchheit

(10) Patent No.: US 8,606,864 B2
(45) Date of Patent: Dec. 10, 2013

(54) DYNAMIC SET OPERATIONS WHEN SPECIFYING EMAIL RECIPIENTS

(76) Inventor: Brian K. Buchheit, Davie, FL (US)

( * ) Notice: Subject to any disclaimer, the term of this patent is extended or adjusted under 35 U.S.C. 154(b) by 393 days.

(21) Appl. No.: 12/983,022

(22) Filed: Dec. 31, 2010

(65) Prior Publication Data

US 2011/0099239 A1   Apr. 28, 2011

Related U.S. Application Data

(63) Continuation-in-part of application No. 11/380,984, filed on May 1, 2006, now Pat. No. 7,886,011.

(51) Int. Cl.
*G06F 15/16* (2006.01)

(52) U.S. Cl.
USPC ........... 709/206; 709/204; 715/751; 715/755; 455/410

(58) Field of Classification Search
USPC ............ 709/206, 204; 715/751, 755; 455/410
See application file for complete search history.

(56) References Cited

U.S. PATENT DOCUMENTS

| | | | | |
|---|---|---|---|---|
| 5,963,938 A * | 10/1999 | Wilson et al. | ........................... | 1/1 |
| 6,529,942 B1 * | 3/2003 | Gilbert | ........................... | 709/206 |
| 7,209,951 B2 * | 4/2007 | Goldberg | ........................... | 709/206 |
| 7,305,443 B2 * | 12/2007 | Larsen | ........................... | 709/206 |
| 7,870,205 B2 * | 1/2011 | LeVasseur et al. | ........................... | 709/206 |
| 8,019,821 B2 * | 9/2011 | Hamilton et al. | ........................... | 709/206 |
| 2003/0026423 A1 * | 2/2003 | Unger et al. | ........................... | 380/217 |
| 2003/0061289 A1 * | 3/2003 | Clissold et al. | ........................... | 709/206 |
| 2003/0130930 A1 * | 7/2003 | Miura et al. | ........................... | 705/37 |
| 2005/0235038 A1 * | 10/2005 | Donatella et al. | ........................... | 709/206 |
| 2006/0265397 A1 * | 11/2006 | Bryan et al. | ........................... | 707/10 |
| 2007/0061487 A1 * | 3/2007 | Moore et al. | ........................... | 709/246 |
| 2008/0222127 A1 * | 9/2008 | Bergin | ........................... | 707/5 |

\* cited by examiner

*Primary Examiner* — Jason K. Gee
*Assistant Examiner* — Sharif E Ullah
(74) *Attorney, Agent, or Firm* — Brian K. Buchheit; Scott M. Garrett; Patents on Demand, P.A.

(57) ABSTRACT

A method for specifying email recipients that includes specifying a first set of email recipients, a second set of email recipients, and a set operation. A third set of email recipients can be automatically is generated by performing the set operation upon the first set and the second set. Email can then be sent to this automatically generated third set of email recipients.

18 Claims, 4 Drawing Sheets

DYNAMIC SET OPERATIONS WHEN SPECIFYING EMAIL RECIPIENTS

CROSS-REFERENCE TO RELATED APPLICATIONS

This continuation-in-part application claims the benefit of U.S. patent application Ser. No. 11/380,984, filed 1 May 2006 entitled "Dynamic Set Operations When Specifying Email Recipients". The entire contents of U.S. application Ser. No. 11/420,255 are incorporated by reference herein.

BACKGROUND

1. Field of the Invention

The present invention relates to the field of email and, more particularly, to the performance of dynamic set operations when specifying email recipients.

2. Description of the Related Art

Email plays a large part in personal and business communications. When sending an email to a large number of recipients, users must enter an identifier for each addressee and/or specify a distribution list containing a static group of previously defined addressees. Large groups of addressees and/or distribution lists can be difficult to manage. Many email applications have the ability to categorize addressees and distribution lists. This ability allows users to organize addressees and distribution lists into user defined recipient groups, such as "Family" or "Coworkers". When graphically selecting recipient groups, users can choose to view only those recipients and distribution lists associated with a defined group.

Despite conventional organizational aids, email applications that support conventional distribution lists lock users into an all-or-nothing arrangement. The applications do not allow a user to send an email to a subset of addressees in a distribution list, such as excluding a specific email address from the list. Instead, users must resort to manually editing the distribution list members or manually selecting individual email addresses. This limitation can be tedious and frustrating to users who desire to send email to a large set of recipients that is similar but not identical to a set of addressees specified within an existing distribution list.

Another problem with many existing implementations of distribution lists is that users cannot combine multiple distribution lists to create a single list that includes all members without a duplication of email addresses. Users can select multiple distribution lists as recipients. However, if an email address appears in multiple lists, this recipient can be sent the email message multiple times. This amount of extraneous email can be taxing on the receiver's email system by consuming more space than necessary. In turn, these extraneous emails can cause the receiver's email inbox to reach capacity faster and, therefore, reject other pertinent messages.

To cope with these shortcomings, many users create a multiplicity of distribution lists with minor differences in an attempt to overcome the inherent static nature of conventional distribution lists. The quantity of modified distribution lists necessary to account for even the most probable permutations is astronomical and increases exponentially as the size and quantity of lists increase. These lists can consume additional storage space, which can degrade the overall performance of the email system. Additionally, the user is challenged with having to constantly decipher somewhat cryptic names often assigned to a plethora of similar distribution lists.

SUMMARY OF THE INVENTION

The present invention permits users of email applications to modify existing email distribution lists through the use of set operations. More specifically, this invention permits a user to specify a first set of email recipients, a second set of email recipients, and a set operation. A third set of email recipients can be automatically generated by performing the set operation upon the first set and the second set. An email message can then be sent to each recipient in the third set. It should be understood that the present invention can combine any number of sets to generate a resultant set and is not to be construed as limited to embodiments where two sets are combined to generate a third set.

The present invention can be implemented in accordance with numerous aspects consistent with the material presented herein. For example, one aspect of the present invention can include a software method for specifying email recipients that includes a graphical user interface that is associated with an email application. Within the graphical user interface, a user specified distribution list, a user specified set operation, and one or more user specified email recipients can be identified. Software algorithms can automatically generate a set of intended email recipients by performing the set operation upon the distribution list and the at least one email recipient.

Another aspect of the present invention can include a graphical user interface (GUI) for sending email. The GUI can include a recipient designation section and a set operation designation section. A set of intended email recipients can be automatically generated by a software program that performs a set operation specified in the set operation designation section against at least two sets of recipients specified in the recipient designation section.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
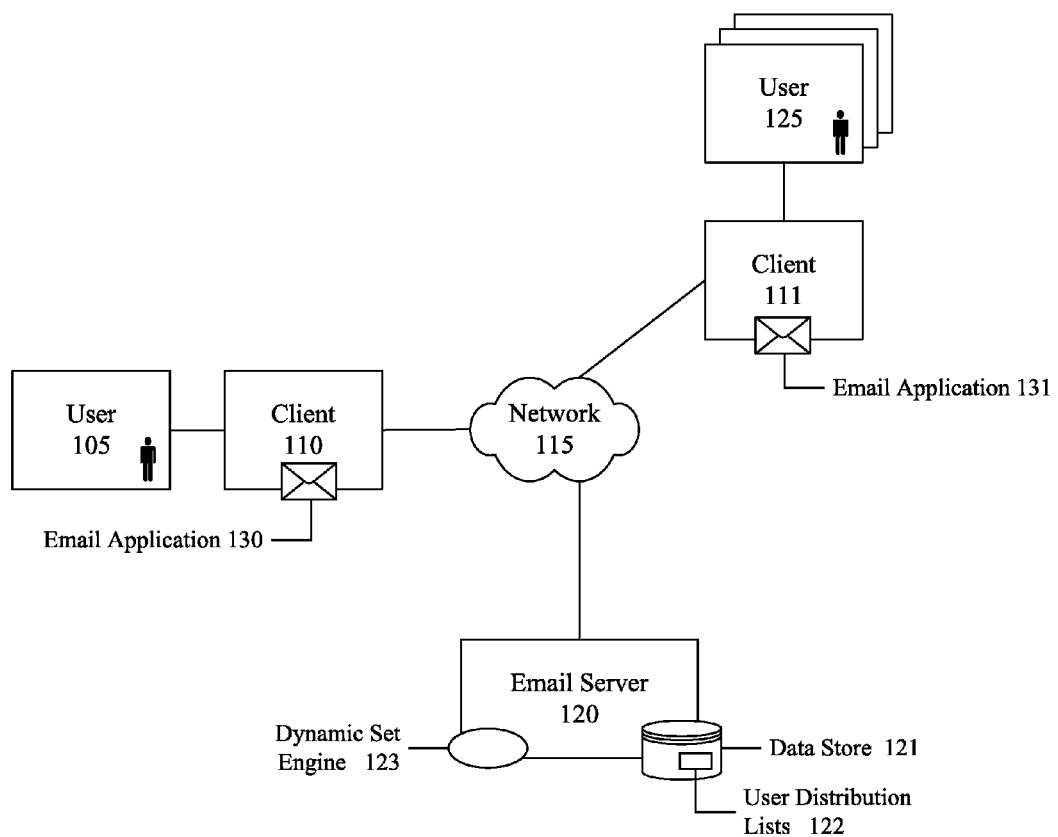
FIG. 1 is a schematic diagram of a system for sending electronic mail in accordance with an embodiment of the inventive arrangements disclosed herein.

FIG. 1 is a schematic diagram of a system 100 for sending electronic mail in accordance with an embodiment of the inventive arrangements disclosed herein. In system 100, user 105 can send an email via email application 130 running on client 110. Email application 130 can be any of a variety of email system interfaces including, but not limited to, a software client, a Web page, a thin client, an applet, and the like. Client 110 can be any of a variety of computing devices including, but not limited to, a personal computer, a kiosk, a personal data assistant (PDA), a mobile phone, and the like.

Client 110 can operate in a stand-alone fashion. Alternatively, client 110 can be a device that cooperatively participates in a network of distributed computing devices. Network 115 can facilitate data exchanges over wireless as well as line-based communication pathways and protocols.

Email application 130 communicates with email server 120 via client 110 and network 115. Email server 120 includes data store 121, which contains user distribution lists 122, and dynamic set engine 123. User distribution lists 122 can include one or more previously defined addressees. User 105 can access user distribution lists 122 for use in email application 130.

Dynamic set engine 123 can include a set of machine-readable instructions for performing dynamic set operations upon user selected recipients and/or previously established distribution lists. Dynamic set engine 123 can be implemented in a variety of manners including, but not limited to, a web service, a server application, a client application, an email server application plug-in component, and the like. Dynamic set engine 123 can receive data from email application 130 and/or data store 121 via network 115. Results from the processing of data can be displayed in email application 130 and stored in data store 121, expanding the contents of user distribution lists 122. In another embodiment, dynamic set engine 123 can reside on client 110.

User 125 can access an email via email application 131 running on client 111. Email application 131 can be any of a variety of email system interfaces including, but not limited to, a software client, a Web page, a thin client, an applet, and the like. Client 111 can be any of a variety of computing devices including, but not limited to, a personal computer, a kiosk, a personal data assistant (PDA), a mobile phone, and the like. Client 111 can operate in a stand-alone fashion. Alternatively, client 110 can be a device that cooperatively participates in a network of distributed computing devices.

Figure 2:
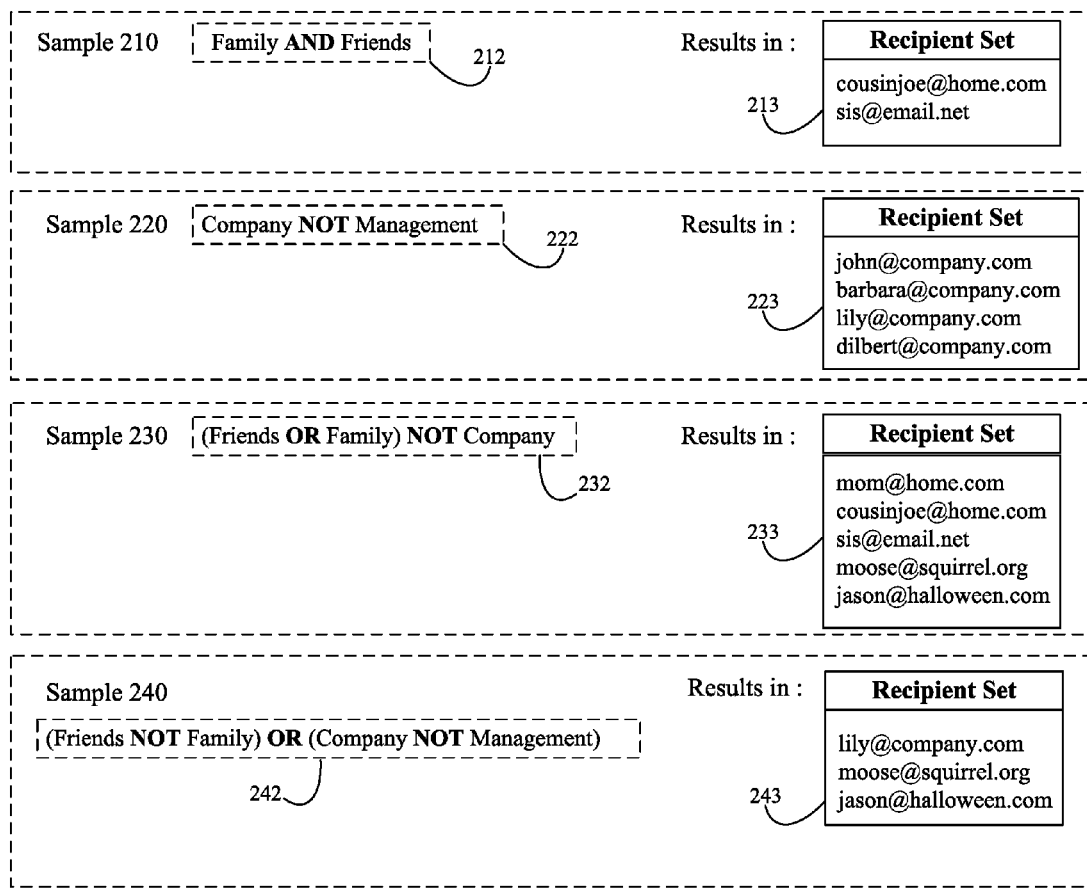
FIG. 2 illustrates a collection of sample user distribution lists and sample operations on the sample user distribution lists.

FIG. 2 illustrates a collection 200 of sample user distribution lists and sample operations on the sample user distribution lists. For illustrative purposes, four distribution lists, Family 201, Friends 202, Company 203, and Management 204, are defined with fictitious email addresses. Family 201 can include email addresses such as mom@home.com, sis@email.net, and cousinjoe@home.com. Friends 202 can include email addresses such as lily@company.com, amy@company.com, cousinjoe@home.com, sis@email.net, moose@squirrel.org, and jason@halloween.com. Company 203 can include email addresses such as john@company.com, barabara@company.com, amy@company.com, steve@company.com, lily@company.com, and dilbert@company.com. Management 204 can include email addresses such as amy@company.com, catbert@hr.net, and steve@company.com.

Sample 210 includes recipient definition 212 and recipient set 213. Recipient set 213 is generated by performing the set operation in recipient definition 212. In this example, recipient set 213 contains those email addresses that exist in both Family 201 and Friends 202.

Sample 220 includes recipient definition 222 and recipient set 223. Recipient set 223 is generated by performing the set operation in recipient definition 222. In this example, recipient set 223 contains those email addresses that exist in Company 203 that are not a member of Management 204.

Sample 230 includes recipient definition 232 and recipient set 233. Recipient set 233 is generated by performing the set operations in recipient definition 232. Order of operation preference is designated by the use of parentheses in recipient definition 232. In this example, recipient set 233 contains those email addresses that exist in either Family 201 or Friends 202, but not in Company 203.

Sample 240 includes recipient definition 242 and recipient set 243. Recipient set 243 is generated by performing the set operations in recipient definition 242. Order of operation preference is designated by the use of parentheses in recipient definition 242. In this example, recipient set 243 contains those email addresses that exist in Friends 202 but not Family 201, or Company 203 but not Management 204.

Figure 3:
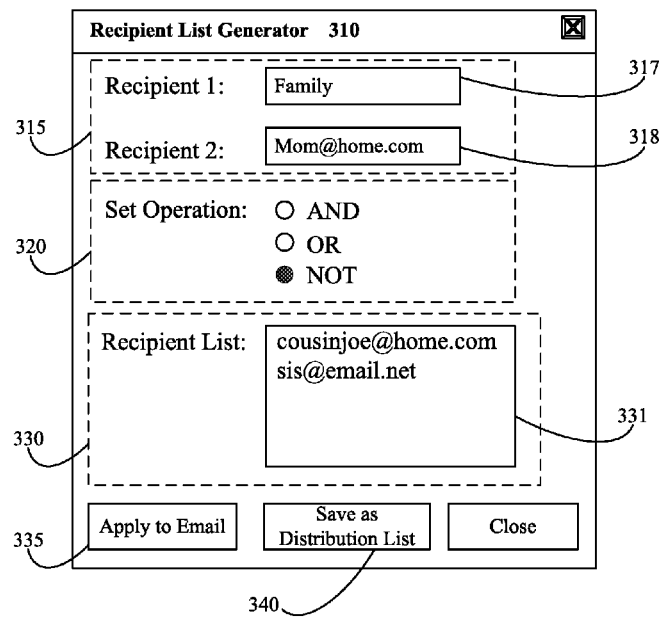
FIG. 3 illustrates a collection of graphical user interfaces (GUIs) for a system that supports dynamic set operations when specifying email recipients in accordance with an embodiment of the inventive arrangements disclosed herein.
Figure 3:
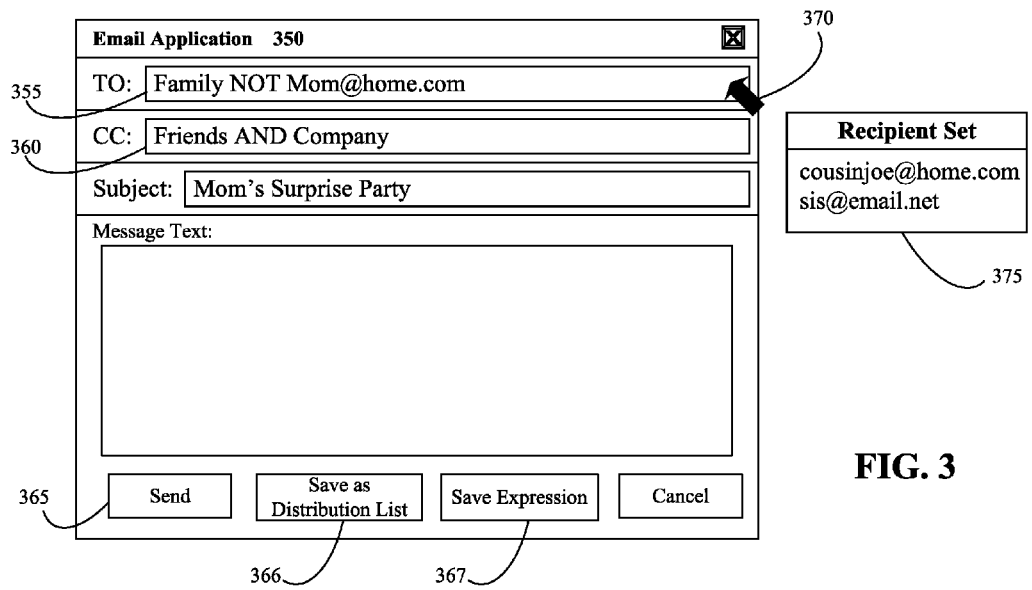

FIG. 3 illustrates a collection 300 of graphical user interfaces (GUIs) for a system that supports dynamic set operations when specifying email recipients in accordance with an embodiment of the inventive arrangements disclosed herein. Recipient list generator GUI 310 can be an external interface to email application 130 of system 100 and can reside on either client 110 or email server 120. Additionally, recipient list generator GUI 310 can utilize the sample user distribution lists of collection 200.

Recipient list generator GUI 310 can include recipient designation section 315, set operation designation section 320, resultant recipient section 330, apply button 335, and save button 340. Recipient designation section 315 can include first set designator 317 and second set designator 318. A user of recipient list generator GUI 310 can specify an email address or a previously established email distribution list in first set designator 317 and second set designator 318. Designation of an email address or previously established email distribution list in first set designator 317 or second set designator 318 can be performed in any of a variety of mechanisms including, but not limited to, input by a user via a keyboard, selection by an user from a drop-down list, a copy-and-paste function performed by a user, selection by an user from a pop-up menu, and the like.

Set operation designation section 320 can contain a graphical display of user selectable set operations. Set operation designation section 320 can be any of a variety of selection mechanisms including, but not limited to, radio buttons, a drop-down list, a pop-up menu, a combo box, and the like.

Resultant recipient section 330 can include resultant recipient set 331. Resultant recipient set 331 displays the results of the operation selected in set operation designation section 320 upon the first set designator 317 and second set designator 318 of the recipient designation section 315. Resultant recipient section 330 can be any of a variety of display methods including, but not limited to, a pop-up window, a fly-over window, a GUI display window, an applet, and the like. Modifications to the contents of resultant recipient set 331 can be made by a user via a mechanism such as a right-click pop-up menu or typing.

Selection of apply button 335 by a user transmits the contents of resultant recipient set 331 to email application 130 of system 100. Selection of save button 340 by a user stores the contents of resultant recipient set 331 in data store 121 of email server 120 of system 100.

Email application GUI 350 can be an interface of email application 130 of system 100 and can reside on either client 110 or email server 120. Additionally, email application GUI 350 can utilize the sample user distribution lists of collection 200.

Email application GUI 350 can include primary recipient designation 355, copy recipient designation 360, a blind copy recipient designation (not shown), and the like. Primary recipient definition 355 and copy recipient definition 360 can accept user input of email addresses, previously established distribution lists, and set operations. Primary recipient definition 355 and copy recipient definition 360 can accept any of a variety of input methods including, but not limited to, a cut-and-paste function, a keyboard, a point-and-click function, a drop-down list, and the like.

Cursor 370 can represent a graphical pointer associated with a computing device. The placement of cursor 370 over primary recipient definition 355 by a user results in the appearance of recipient set window 375. Recipient set window 375 can be a display for the results of the set operation defined in primary recipient definition 355. Recipient set window 375 can be any of a variety of display methods including, but not limited to, a pop-up window, a flyover pop-up window, an application window, and the like.

The selection of send button 365 by a user results in the dispatching of the email to the email addresses designated by primary recipient definition 355 and copy recipient definition 360. The selection of the save list button 366 by a user stores the contents of recipient set 375 which contains the list as defined by primary recipient definition 355, copy recipient definition 360, or both in data store 121 of email server 120 of system 100. The selection of save expression button 367 stores the contents of either primary recipient definition 355 or copy recipient definition 360 or both for future reuse.

It should be appreciated that interfaces 310 and 350 are provided to demonstrate concepts described for an embodiment of the inventive arrangements disclosed herein. Interfaces 310 and 350 are not intended to constrain the scope of the invention to a particular contemplated expression. Derivatives of interfaces 310 and 350 including different interface elements, arrangements, layouts, and the like are contemplated herein. Further, although examples shown in interfaces 310 and 350 illustrate two sets being combined to generate a third recipient set, the invention is not to be limited in this regard. That is, any number of recipient sets or distribution lists can be combined to generate a resultant recipient set or dynamic distribution list.

Figure 4:
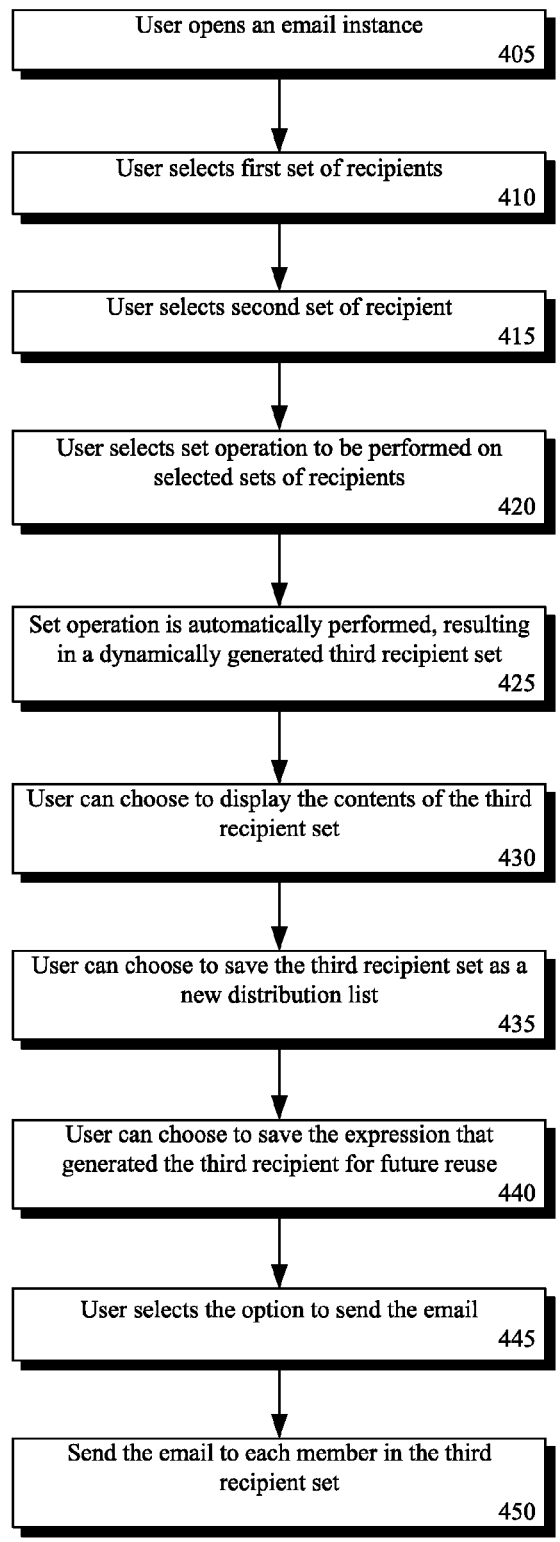
FIG. 4 is a flow chart of a method for the use of dynamic set operations when specifying email recipients in accordance with an embodiment of the inventive arrangements disclosed herein.

FIG. 4 is a flow chart of a method 400 for the use of set operations when specifying email recipients in accordance with an embodiment of the inventive arrangements disclosed herein. Method 400 can be performed in the context of system 100 or in the context of any other system allowing the composition and sending of email. Additionally, method 400 can be performed in the context of recipient list generator GUI 310 or email application GUI 350 or in the context of any other GUI that supports the performing of set operations on recipient lists.

Method 400 can begin in step 405, where a user opens an email instance. In step 410, a user selects their first set of recipients. The first set of recipients can be any of a variety of email addressee representations including, but not limited to, a single email address, a name of a previously established distribution list of email addresses, an identifier that is associated with an email address, and the like. A second distribution list is selected in step 415. The second set of recipients can be any of a variety of email addressee representations including, but not limited to, a single email address, a name of a previously established distribution list of email addresses, an identifier that is associated with an email address, and the like.

In step 420, a set operation is selected by a user that is to be performed upon the sets of recipients selected in steps 410 and 415. Step 425 is the performance of the set operation designated in step 420 upon the sets of recipients identified in steps 410 and 415, resulting in a dynamically generated third recipient set. A user can choose to display the contents of the third recipient set graphically in step 430. The contents of the third recipient set can be displayed in any of a variety of methods including, but not limited to, a pop-up window, a flyover pop-up window, an application window, a text box, and the like. In step 435, a user can choose to save the contents of the third recipient set for future reuse as an established distribution list in data store 121 of email server 120 of system 100. The expression used to generate the third recipient set can be saved by a user for future reuse in step 440. In step 445, a user selects the option to send the email. Step 450 sends the email to each member of the third recipient set.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method comprising:

at least one of one or more computing devices providing an electronic message user interface;

at least one of the one or more computing devices identifying an electronic message to be sent by a user to a plurality of recipients, each of the plurality of recipients being uniquely identified with a recipient address to a recipient account for receiving electronic messages, wherein sent ones of the electronic message are stored within a non-transitory storage medium and are thereafter accessible by a corresponding one of the plurality of recipients;

at least one of the one or more computing devices receiving user input into two different designation sections from the user via the electronic message user interface, said user input for a first one of the two different designation sections specifying a list name of a predefined list for a first set of two or more recipients, a user specified set operator, and a second set of one or more recipients, wherein said predefined list is maintained specifically for the user by an electronic messaging system to which the electronic message user interface is linked, wherein said user input for a second one of the two different designation sections including a third set of one of more recipients;

at least one of the one or more computing devices mathematically evaluating the first set and the second set using the set operator to dynamically generate a replacement set, wherein the mathematically evaluating causes at least one recipient of the first set to be excluded, whereby the replacement set includes fewer recipients than a quantity of recipients included in the first set, wherein the at least one excluded recipient of the first set include one recipient referred to as a first-designated-section-excluded-recipient, wherein the third set includes the first-designated-section-excluded-recipient;

at least one of the one or more computing devices creating a new predefined list from the replacement set;

saving the new predefined list for future reuse by users, who are able to thereafter specify the new predefined list by name within the electronic message user interface, wherein the new redefined list consists of the replacement set of recipients, wherein the saving saves an expression by an expression name, wherein the expression comprises the name of the predefined list name for a first set of two or more recipients, the set operator, and the second set of one or more recipients, wherein the saved expression is thereafter able to be utilized to define the replacement set, wherein whenever the predefined list for the first set of two or more recipients is changed, the expression used after the new predefined list is dynamically evaluated as a new replacement set different from said replacement set by virtue of the change to the predefined list for the first set of two or more recipients; and at least one of the one or more computing devices receiving from the user a user selection of a send option from the electronic message user interface, wherein election of the send option causes the electronic message to be conveyed the replacement set of recipients as specified in the first one of the designation sections, wherein election of the send option also causes the electronic message to be conveyed to the third set of recipients as specified in the second one of the designation sections, wherein the first-designated-section-excluded-recipient is sent the electronic message but is not indicated in the sent electronic message as being included in the first one of the designated sections, and wherein if the first-designated-section-excluded-recipient was not included in the third set then the first-designated-section-excluded-recipient would not have been sent the electronic message.

2. The method of claim 1, wherein the electronic message is an email message, wherein the electronic message user interface is an email user interface, wherein each recipient address is an email address, wherein the predefined list is an email distribution list.

3. The method of claim 1, wherein the electronic message user interface comprises a plurality of different designation sections for designating message recipients, wherein the replacement set defines recipients for a single one of the different designation sections, wherein other ones of the designation sections are unaffected by mathematically evaluating the user specified set operation.

4. The method of claim 1, wherein the user specified set operation, the list name, and the second set of one or more recipients are typed into one of a plurality of different designation sections of the electronic message user interface.

5. The method of claim 1, wherein the user specified set operation is an intersection operation, wherein the replacement set is an intersection of the first set and the second set.

6. The method of claim 1, wherein the user input does not expressly enumerate a list of recipients of the replacement set, said method further comprising:
at least one of the one or more computing devices presenting within the electronic message user interface an enumerated list of recipients of the replacement set.

7. The method of claim 1, further comprising:
at least one of the one or more computing devices providing the electronic message user interface that presents an option for a user to save a new predefined list for the replacement set.

8. The method of claim 1, wherein the user specified set operation is a subtraction operation, wherein the replacement set is a set-theoretic difference of the first set and the second set also referred to as the relative complement of the second set in the first set.

9. A method comprising:
receiving at an email server an email message from a remotely located computing device;
determining a set of email recipients from a header of the email message, wherein said header specifies different groups of email recipients, one of the different groups being a TO group, wherein each of the different groups are evaluated by the email server independent of evaluations of other ones of the different groups;
during the determining, ascertaining that one of the different groups specifies a distribution list, a set operator, and either a different distribution list or a recipient set of one or more email addresses;
determining a replacement set of recipients by evaluating the distribution list name, the set operator, and the different distribution list or the recipient set, wherein the replacement set includes fewer recipients than those included in the distribution list;
creating a new distribution list from the determined replacement set;
saving the new distribution list for future reuse by users, who are able to thereafter specify the new distribution list by name within a TO, CC, or BCC section of an email user interface, wherein the new distribution list consists of the replacement set of recipients, wherein the saving saves an expression by an expression name, wherein the expression comprises the distribution list name, the set operator, and the different distribution list or the recipient set, wherein an email client or the email server thereafter permits the saved expression to be utilized to define the replacement set, wherein whenever the distribution list is changed, the expression used after the distribution list change is dynamically evaluated as a new replacement set different from said replacement set by virtue of the change to the distribution list; and
sending the email message to each of the set of recipients in the replacement set, wherein at least one of the receiving, the determining of the set of email recipients, the ascertaining, the determining of the replacement set, the saving of the new distribution list, and the sending are performed by a computing device executing program instructions stored in a non-transitory storage medium.

10. The method of claim 9, wherein the one of the different groups specifies the distribution list, the set operator, and the different distribution list, wherein the determining of the replacement set evaluates the distribution list name, the set operator, and the different distribution list.

11. The method of claim 9, wherein the one of the different groups specifies the distribution list, the set operator, and the recipient set, wherein said recipient set explicitly specifies a set of email recipients by email addresses, wherein the determining of the replacement set evaluates the distribution list name, the set operator, and the recipient set.

12. The method of claim 9, wherein the set operator is an operation representing that recipients in the different distribution list or the recipient set are to be excluded from the replacement set, wherein the replacement set includes a set of recipients from the distribution list that are not included in the different distribution list or the recipient set.

13. The method of claim 9, wherein the set operator is an operation representing only those recipients included in the distribution list and included in the different distribution list or recipient set are to be included in the replacement set, wherein the replacement set includes a set of recipients from the distribution list that are also included in the different distribution list or the recipient set, wherein recipients in the distribution list that are not in the different distribution list or recipient set are excluded from the replacement set.

14. A method for establishing a set of a plurality of email recipients comprising:
    at least one of one or more computing devices receiving user input specifying a distribution list, a set operator, and either a different distribution list or a recipient set of one or more email addresses,
    at least one of the one or more computing devices determining the replacement set of recipients by evaluating the distribution list name, the set operator, and the different distribution list or the recipient set, wherein the replacement set includes fewer recipients than those included in the distribution list, wherein the set operator is an exclusion operator or an intersection operator, wherein the exclusion operator is an operator representing that recipients in the different distribution list or the recipient set are to be excluded from the replacement set, wherein the intersection operator is an operator representing only those recipients included in the distribution list and included in the different distribution list or recipient set are to be included in the replacement set;
    at least one of the one or more computing devices creating a new distribution list from the determined replacement set that results from the user input being evaluated; and
    at least one of the one or more computing devices saving the new distribution list for future reuse by users, who are able to thereafter specify the new distribution list by name within a TO, CC, or BCC section of an email user interface, wherein the new distribution list consists of the replacement set of recipients, wherein the saving saves an expression by an expression name, wherein the expression comprises the distribution list name, the set operator, and the different distribution list or the recipient set, wherein an email client or an email server thereafter permits the saved expression to be utilized to define the replacement set, wherein whenever the distribution list is changed, the expression used after the distribution list change is dynamically evaluated as a new replacement set different from said replacement set by virtue of the change to the distribution list.

15. The method of claim 14, wherein the saving occurs responsive to a user selecting a save button from the email user interface, wherein the saving of the new distribution list does not require a user of the email user interface to enumerate the replacement set except by providing the user input.

16. The method of claim 14, wherein after the new distribution list has been saved for future reuse, the replacement set of recipients of a saved version of the new distribution list dynamically and automatically changes, in response to changes to the distribution list, wherein the changes to the distribution list occur after a first time the new distribution list was saved.

17. The method of claim 14, wherein after the new distribution list has been saved for future reuse, the replacement set of recipients of a saved version the new distribution list dynamically and automatically changes in response to changes to either the different distribution list or the recipient set, wherein the changes to the distribution list occur after a first time the new distribution list was saved.

18. The method of claim 14, further comprising:
    after the new distribution list is saved and maintained by the email server, detecting a change in one of the distribution list or the different distribution list if a different distribution list is used to represent the replacement set;
    responsive to the change, automatically determining a new replacement set by evaluating distribution list or the different distribution list in a post change form as they exist after the change was detected; and
    responsive to determining the new replacement set, updating the new distribution list maintained by the server so that the updated version of the new distribution list includes only the set of recipients in the new replacement set.

* * * * *